Dec. 12, 1933.  A. E. HALL  1,939,050
SIGNALING DEVICE
Filed Feb. 7, 1929  4 Sheets-Sheet 1

WITNESSES:
Gerhard Baule
Evelyn Crompton

INVENTOR:
Allen E. Hall,
BY
Joshua R. H. Potts
ATTORNEY.

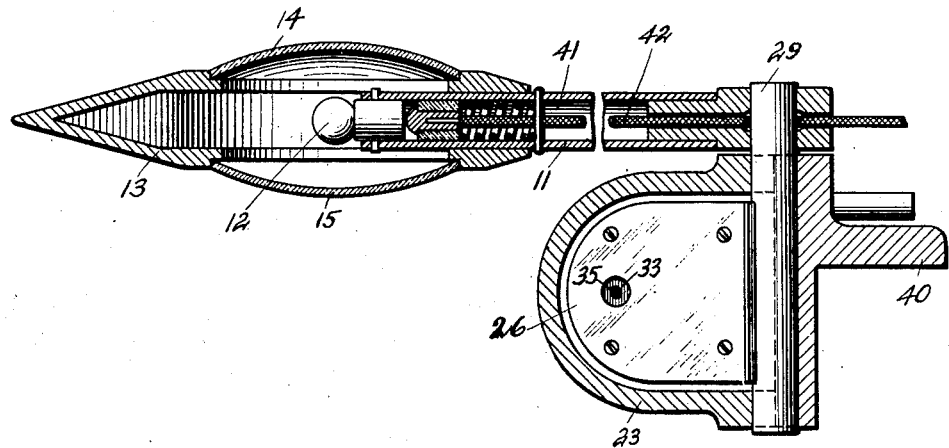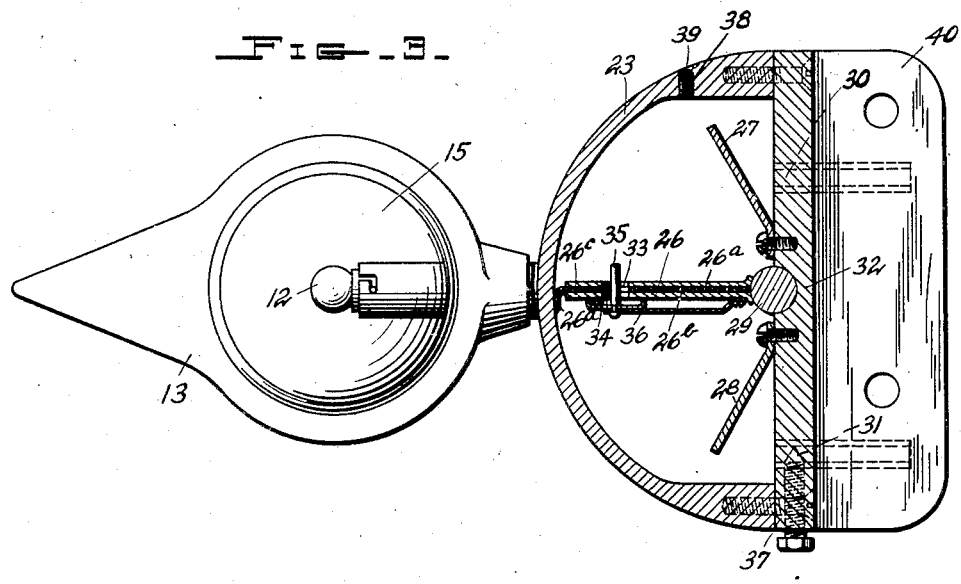

Dec. 12, 1933.    A. E. HALL    1,939,050
SIGNALING DEVICE
Filed Feb. 7, 1929    4 Sheets-Sheet 3
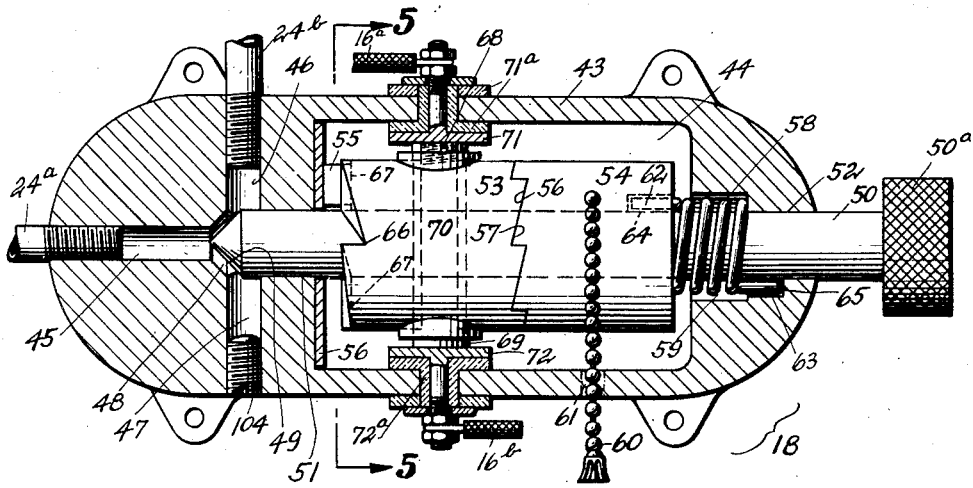
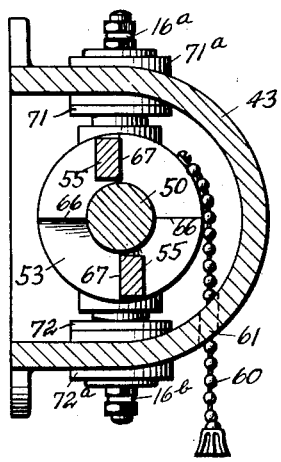
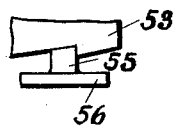
WITNESSES:
Gerhard Baule
Evelyn Crompton
INVENTOR:
Allen E. Hall,
BY
Joshua R. H. Potts
ATTORNEY.

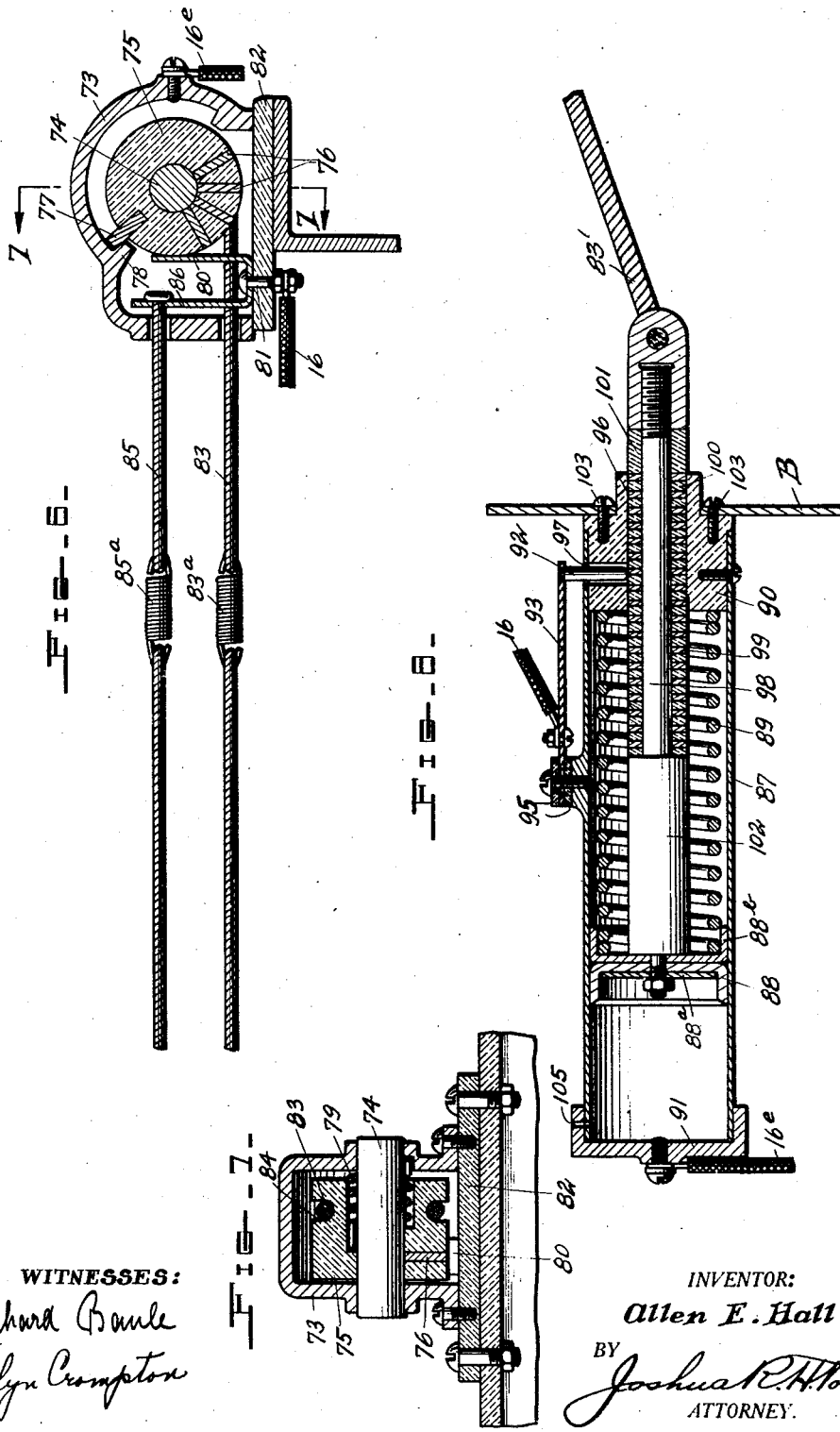

Patented Dec. 12, 1933

1,939,050

UNITED STATES PATENT OFFICE 1,939,050

SIGNALING DEVICE

Allen Evert Hall, Newport News, Va., assignor of fifty-one percent to Edmund Francis Heard, Newport News, Va.

Application February 7, 1929. Serial No. 338,112

8 Claims. (Cl. 116—39)

The present invention relates to signaling devices and particularly to such devices as are adapted for use on moving vehicles of an automotive type.

An object is to provide an improved signal for use with motor vehicles.

Further objects of the invention are to provide a signal which is automatic in its operation when set in motion and which is capable of giving a plurality of different signals.

A still further object is to provide a signal applicable to vehicles of all known types.

A fourth object is to provide a signal having oscillatory action governed through a suitable control.

According to my invention, the signal device comprises a member adapted for reciprocatory or oscillatory and for intermittent action. The device may further be automatic in all of its operations after being set in motion for each of the various signals of which it is capable. The oscillations of the device may be effected by provision of suitable mechanism connected with pressure or suction producing parts of the engine of the vehicle as to the intake manifold.

The drawings illustrate an embodiment of the invention and the views therein are as follows:

Figure 2 is an enlarged sectional detail view of the signal and the pneumatic operating mechanism therefor.

Figure 3 is a similar sectional view taken at right angles to that in Figure 2.

Figure 4 is an enlarged section detail of a combined valve and switch control for the signal.

Figure 5 is a section on the line 5—5 of Figure 4 looking in the direction of the arrows.

Figure 6 is a detail section on an enlarged scale showing certain switch mechanism for controlling certain actions of the signal lamp taken on line 6—6 of Figure 1.

Figure 7 is a section on line 7—7 of Figure 6 looking in the direction of the arrows and showing further the construction of this switch mechanism.

Figure 8 illustrates in section a substitute construction for that shown in Figures 6 and 7.

Figure 9 is a fragmentary detail view showing a part of one of the control devices.

Figure 1:
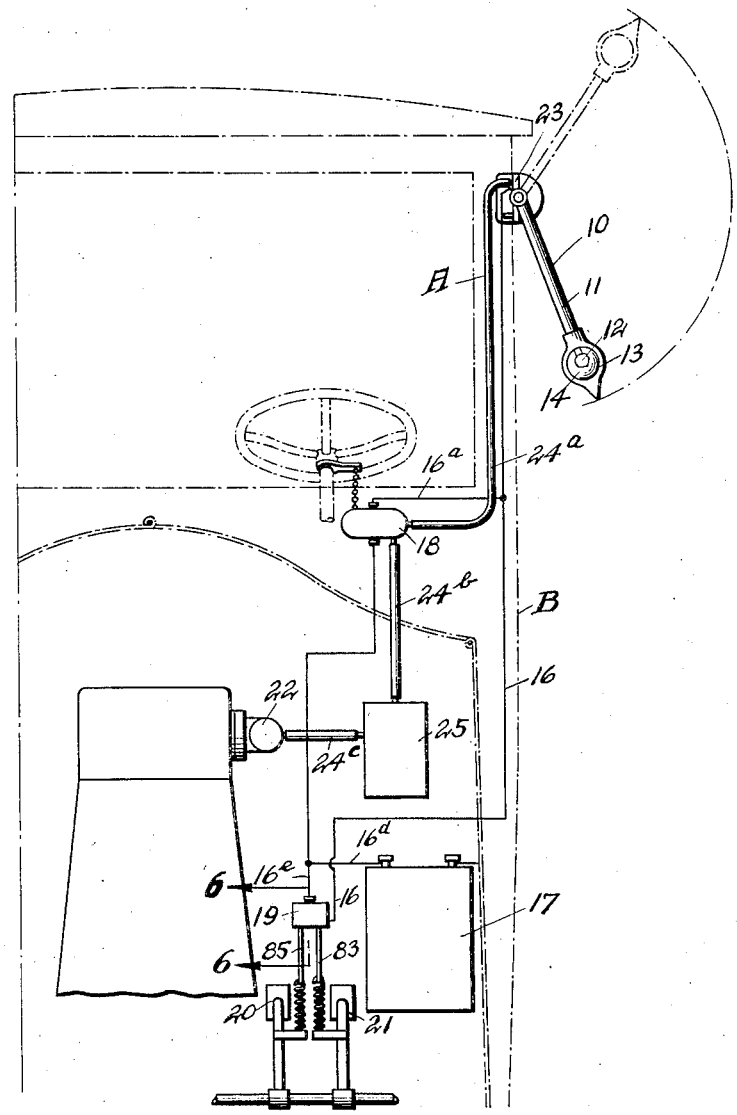
Figure 1 is a more or less diagrammatic view showing the connection of the signal to a motor vehicle and its operative connection with the engine and various controls for the vehicle.

Referring to Figure 1 of the drawings, A indicates my signaling device which is attached to a vehicle B shown in dotted lines and represents the signal proper 10 as mounted on the left side of the vehicle and at the front thereof. The signal preferably consists of a semaphore arm 11 on which is mounted a lamp 12 in the nature of an electric light bulb placed within a casing 13 having front and rear windows covered by lenses 14 and 15 (see Figures 2 and 3).

The lamp is connected through suitable conductors 16 to a source of electrical energy as a battery 17, the conductor 16 being connected to one pole of the battery the other pole being grounded to the vehicle chassis as is also the other terminal of the lamp.

Connected in the conductor 16 are control devices 18 and 19 for operating the semophore arm and the lamp associated therewith, the former being adapted for operation by the hand of the driver of the vehicle and the latter being operable by certain foot pedals 20 and 21 incident to the actuation thereof for controlling certain of the mechanism of the vehicle.

The vehicle control devices selected for operating the various signal movements are preferably those which govern the particular action of the vehicle which the signal indicates so far as this is possible, thereby rendering the operation of the signal automatic upon the actuation of these governing influences.

Referring again to Figure 1, 22 indicates the intake manifold of the engine, with which a vacuum chamber 23 of my device is connected through conduits 24ª, 24ᵇ, and 24ᶜ between certain of which conduits as indicated in the drawings is positioned, control 18 which includes a valve for controlling flow of fluid through the conduits, as will later appear. Between other of the conduits is positioned a vacuum tank 25 which has the function of causing the action of the semaphore arm to be more smooth than would be the case were the vacuum chamber 23 connected directly to the engine.

The construction of the vacuum chamber 23 is represented in one form in Figures 2 and 3 and comprises a casing preferably semicylindrical in contour, having a vane or piston 26 rotatable therein between limiting stops in the nature of spring arms 27 and 28. The vane is secured to a shaft 29 extending axially of the casing and journalled in its side walls. To this shaft is also secured the semaphore arm 11 for rotation therewith. It will therefore appear that movement of the vane 26 will enforce a corresponding movement of the arm 11.

The casing 23 is provided with openings 30 and 31 on opposite sides of the shaft 29 and vane 26 preferably in the flat wall 32 of the casing. The vane 26 is also provided with an aperture or port 33 controlled by valve 34 having a stem 35 extending through aperture 33 and beyond the upper side of vane 26.

A valve spring 36 holds the valve 34 in line with the seat and also holds the valve off the seat when the pressure in the chamber below the vane or piston is released, and when the valve is closed by contact with the spring arm 28, the pressure on the spring holds the valve shut, and as the vane moves upward, the valve is opened by contact with the spring arm 27.

At that point the valve spring 36 is moved outward as the valve opens, and it will remain in this condition during the downward movement of the piston, permitting a flow of fluid through the aperture or port 33, which is restricted by the regulating valve 37. Vane 26 may be constructed of parallel sheets of metal 26$^a$ and 26$^b$ between which a flexible member 26$^c$ is secured having a protruding portion 26$^d$ extending peripherally beyond the plates and wiping on the inner wall of casing 23 for rendering the vane margin fluid-tight.

This device will operate either under vacuum created on the upper side of the vane or by pressure exerted on the underside and both apertures 30 and 31 are constructed so that an appropriate conduit may be attached thereto according as the device is to be operated under pressure or by vacuum. The aperture 31 is provided with a regulating valve 37 threaded into the casing and adapted to be set to control the flow of fluid into the chamber 23 below the vane 26. It is also apparent that if pressure is applied to the upper side of the vane, or vacuum to the lower side thereof, the signal alarm 11 will be sustained in its non-signaling position.

Stop arms 27 and 28 extend across the path of travel of the valve 34 and are contacted at the ends of this path by the valve stem 35 and by the valve respectively for opening and closing the aperture or port 33.

The casing 23 may be provided with an opening 38 having a suitable closure 39. This opening is for the lubrication of parts within the casing. A web 40 may be provided on the casing for attaching the same to a support.

The arm 11 may be made hollow as indicated at 41 to accommodate a conductor 42 connected by conductor 16 with battery 17.

Communication between the chamber 23 and the vacuum tank 25 is controlled by mechanism within the control device 18 together with control of the flow of electric current to the lamp 12, the two systems being controlled simultaneously by the same operation of the central mechanism. The construction and operation of this control will now be described with particular reference to Figures 4 and 5. The control comprises a casing 43 having a chamber 44 formed therein and a plurality of passageways 45, 46 and 47 formed therein and communicating through a valve seat 48. The flow of fluid through these passageways is controlled by a valve 49 which may be of conical shape to correspond with the shape of the seat 48 and as shown is formed in the end of the stem or shaft 50 slidable longitudinally of the casing 43 and supported for this purpose in bearings 51 and 52.

The valve 49 may be closed or opened through the instrumentality of ratchet and cam mechanism located within the chamber 44 and consisting of collars 53 and 54, the former being fixed to shaft 50, and the latter revoluble thereon, together with a pair of cam members 55 secured to a plate 56 positioned in one end of the chamber 44 as shown in Figure 4 and fitting therein against rotation. The cam members are arranged diametrically opposite, for a purpose which will presently appear.

The collars 53 and 54 have on their adjacent ends ratchet teeth 56 and 57 held in yielding engagement by the spring 58 seated within recess 59 of the casing 43. Collar 54 is rotated in any suitable manner as through a pull on the chain 60 attached thereto and passing through a suitable aperture 61 in the casing and the spring 58 serves to return this collar to its normal position after each pull on the chain. In order that the spring may perform this function, it is provided at its ends with axially extending fingers 62 and 63 secured respectively to the collar 54 and to the casing 43, which are provided with sockets 64 and 65 in which the fingers rest. The opposite end of the collar 53 from that bearing the ratchet teeth 56 is provided with cam surfaces in the form of notches 66 and 67, the former being deep and the latter shallow. These notches are arranged in pairs and diametrically opposite so as to ride upon the cam members 55 previously described which have sloping faces to facilitate the riding of the correspondingly sloping faces of the notches thereupon.

The depth of the notches 66 is such as to permit the seating of the valve 49 under the urge of spring 58 whereas the notches 67 are constructed of a depth to prevent this seating. The notches 66 and 67 alternate so that each quarter turn of the collar will open or close the valve 49.

Contacts 68 and 69 are arranged on diametrically opposite portions of the collar 53 and are connected through the insulated conductor 70. The contacts are contacted with terminals 71 and 72 of conductors 16$^a$ and 16$^b$ respectively insulated from the casing 43 by suitable insulators 71$^a$ and 72$^a$. These contacts are aligned with the shallow notches 67 so that the circuit of the lamp 12 may be energized simultaneously with the opening of the valve 49, and the consequent movement of the semaphore arm 11, and deenergized when said valve is closed. The valve and switch of the control 18 may also be operated manually through the knurled head 50$^a$ secured to the end of shaft 50.

In addition to the reciprocal "wig-wagging" of arm 11 which may constitute one signal as to indicate a turn to the left, additional movement indicating signals may be effected to indicate a right turn and the stopping of the vehicle. A right turn may be indicated by causing the lamp 12 to glow intermittently and a steady glow of the lamp may be used to indicate the driver's intention to stop.

The latter signal may be effected through suitable mechanism incident to the depression of the brake operating pedal 20 while the intermittent or blinking signal may be arranged to be operated incident to the clutch operating lever 21. The operation of these two signals is therefore accomplished by the feet of the driver leaving his hands free to operate the steering wheel. One combination of mechanism by which these signals may be effected is illustrated in Figures 6 and 7 of the drawings and consists of a casing 73 of electrically conductive material in which is journalled a shaft 74 of conductive material, to which the disc 75 of insulating material is secured. This disc is provided with a plurality of conductors 76 radially arranged and affording spaced contact points on the periphery of the disc. Each of these conductors is in conductive contact with the shaft 74 which is conductively connected with the battery 17 through the casing 73 and conductors 16ᵈ and 16ᵉ.

The disc 75 is provided with a stop member 77 normally held against a shoulder 78 by the force of the spring 79 connected to the disc and to the casing in a manner similar to that described in connection with spring 58. The spring is set in a socket formed in the disc as clearly shown in Figure 7 and is thoroughly protected against mutilation or distortion other than that which is intended. Arranged tangentially to the disc is a brush 80 mounted by means of bolt 81 upon an insulating fibre block 82 and electrically connected with the lead 16 to the lamp 12.

The disc is connected for rotation through a half turn to the clutch pedal 21 through cable 83 which rides in a peripheral groove 84 formed in the disc and is attached at one end to the disc and at its other end to the pedal. It will be readily seen from the above description taken with the drawings that depression of the foot lever 21 will cause an intermittent or blinking glow of lamp 12.

A steady glow of the lamp may be effected through depression of brake pedal 20 by a cable 85 similar to cable 83 connected between switch 86 and brake pedal 20. The switch 86 is formed as a branch of the brush 80 and completes the circuit formed by conductors 16, 16ᵈ and 16ᵉ through the lamp by means of the casing 73 with which it contacts when pedal 20 is depressed.

Both cable 83 and 85 are provided intermediately of their length with helical springs 83ᵃ and 85ᵃ to relieve the switch mechanisms and the cables or straps of too much tension should the pedals be depressed too far. This control mechanism designated generally in Figure 1 by the numeral 19 may be known as the "blinker" switch because of its capability in providing an intermittent glow of the lamp.

An alternative form of this switch is represented in Figure 8 of the drawings and comprises a cylinder 87 in which a piston 88 is adapted to reciprocate. The piston is normally held at the left end of the cylinder by pressure of the helical spring 89 abutting at its opposite ends the piston head and the end of the casing 90 respectively.

The opposite end of the cylinder is closed by a cap 91 of conductive material which is electrically connected to conductor 16ᵉ leading to the positive pole of the battery 17. The lead 16 to the lamp is preferably connected to a contact pin or brush 92 yieldingly mounted on the casing by a spring 93 secured to the casing by a screw 94 and insulated therefrom by discs 95.

The end 90 of the casing is preferably of insulating material and is provided with an axial bore 96 communicating with a radial bore 97 respectively to slidingly accommodate the piston rod 98 and the contact pin 92. The piston rod is connected with piston head 88 and has mounted thereon a plurality of alternate conductive and insulating discs or rings 99 and 100. The outer end of this rod is provided with an insulating collar 101 of considerably greater length than that of the rings 100 upon which the contact 92 rests when the piston is at the left end of the cylinder. The alternating discs 99 and 100 are spaced from the piston 88 by an enlargement 102 of the rod 98 and when the piston is pulled to its extreme right position the light will glow steadily. The rod 98 and head 88 and cup washers 88ᵃ and 88ᵇ associated therewith are all of conductive material so that the circuit through the control may be made when the piston is operated by the foot levers as in the case of the blinker switch described above. The device may be connected to the vehicle body B by means of screws 103.

Bores 46 and 47 in the control 18 are coaxial and bore 47 may be closed by a plug 104 threaded therein.

The operation of the device for producing the various signals is as follows: Assuming that the driver of the car wishes to make a turn to the left and that the signal therefor is an oscillating arm or light, a pull on the chain 60 will rotate the collar 54 a quarter turn which will carry with it the collar 53 which is fast to the valve stem 50 bringing the electric contacts 68 and 69 into electrical communication with the terminals 71 and 72 thus causing the lamp to glow at the same time bringing the communicating faces of the shallow notches 67 in the collar 53 into opposition with the ends of the members 55, thus withdrawing the valve 49 from its seat 48, thus producing a suction in the upper part of the chamber 23 due to the action of the intake manifold connected with the pipe 24. This suction will cause the vane 26 to rise under the pressure of the air from beneath until the stem 35 contacts with the stop member 27 whereupon the valve 34 will be opened permitting fluid to pass through the aperture 33 whereupon the vane 26 will descend by gravity until the valve 34 contacts with the stop 28 closing the same, whereupon it will reverse its movement. This will be repeated so long as the engine is running and the valve 49 remains open.

In this oscillatory movement of the vane 26, the arm 11 will be carried therewith providing an oscillatory movement of the arm and vane.

When it is desired to discontinue the signaling, the chain 60 is given another pull whereupon the valve will close and the electrical contact will be broken. These two operations, it will be noted are accomplished by a single movement of the operator's arm.

When it is desired to signal a turn to the right, the operator presses clutch lever 20 with his foot, whereupon the disc 75 will be revolved causing an intermittent electrical connection through the lamp with a consequent blinking of the light indicating the driver's intent to make a turn to the right.

When it is desired to indicate the driver's intention to stop the vehicle, the stopping of the machine and the signaling of the intent may be accomplished through the depression of the brake lever 21 which will cause the switch 86 to contact with the casing 73 completing a circuit through the lamp which will be steady and continuous so long as the contact is unbroken.

In accomplishing these two latter signals by means of the device illustrated in Figure 8 the piston is drawn to the right through cable 83¹ which may be attached to both levers in a manner to cause the device to operate according to the signal desired.

When it is desired to produce the intermittent light, the piston is drawn quickly to the right and allowed to return to its left limit under the influence of the spring 89.

As the piston is drawn to the right, air will enter the cylinder through the port 105 and as the piston returns, this air will be slowly expelled and the pressure thereof will prevent a too rapid return of the piston under the influence of the spring 89.

When it is desired to signal the stopping of the machine, the piston is drawn far enough to the right so that the contact 92 will rest on the cylindrical portion 102 whereupon the circuit will be made from the cylindrical portion, the casing, the conductor 16e and the conductor 16 causing the light to glow steadily and continuously, drawing of the pistons to the right will be compartively rapid and while the contact 92 will pass over the spaced discs 90, the making and breaking of the circuit will be so rapid as to produce no perceptible fluctuation of the light, in consequence, no confusion of signaling will be effected by this movement.

The advantages of the above construction, it is believed, will be apparent from the foregoing specifications which show illustrative forms of my device.

Of course, the signaling device, illustrated herein, may be modified and changed in various ways without departing from the invention herein set forth and hereinafter claimed.

I claim:

1. In a vehicle signal, a motor including a piston chamber, an oscillatory shaft and a piston within said chamber and fixed to said shaft, a fluid conduit leading to said chamber, means actuated by the movement of the piston for changing the relative pressure on opposite sides of said piston at the end of each stroke, and a signal arm fixed to said shaft and movable therewith.

2. In a vehicle signal, a motor including a piston chamber, an oscillatory shaft and a piston within said chamber and fixed to said shaft, a fluid conduit leading to said chamber, means within said chamber for changing the relative pressure on opposite sides of said piston at the end of each stroke, and a signal arm fixed to said shaft and movable therewith.

3. In a vehicle signal, a motor including a piston chamber, an oscillatory shaft and a piston within said chamber and fixed to said shaft, a fluid conduit leading to said chamber, a port in said piston, a valve controlling said port, and means for actuating said valve to open and close said port as the piston reaches the ends of its oscillations respectively, and a signal arm fixed to said shaft, substantially as described.

4. In a vehicle signal, a motor including a piston chamber, an oscillatory shaft and a piston within said chamber and fixed to said shaft, a fluid conduit leading to said chamber, a port in said piston, a valve controlling said port and spring arms for engaging said valve and adapted to actuate the same to open and close the port as the piston reaches the ends of its oscillations respectively.

5. In a vehicle signal, a motor comprising a piston casing and piston, an oscillatory shaft to which said piston is fixed, a signal arm fixed to said shaft, a conduit leading to the casing on each side of said piston, a valve stem, a valve on said stem controlling the passageway through one of said conduits; ratchet mechanism for operating said valve including a pair of collars on said stem, one of said collars being fixed on said stem and the other collar being loose thereon and cooperating ratchet faces on said collars; and means for operating said ratchet mechanism.

6. In a vehicle signal, a motor comprising a piston casing and piston, an oscillatory shaft to which said piston is fixed, a signal arm fixed to said shaft, a conduit leading to the casing on each side of said piston, a valve stem, a valve on said stem controlling the passageway through one of said conduits, ratchet mechanism for operating said valve, including a pair of collars on said stem, one of said collars being fixed to said stem and the other collar being loose thereon, cooperating ratchet faces on said collars; means for imparting a partial revolution to the loose collar and a spring normally holding the ratchet faces in engagement and for returning the loose collar to initial position when released.

7. In a vehicle signal, a motor comprising a piston casing and piston, an oscillatory shaft to which said piston is fixed, a signal arm fixed to said shaft, a conduit leading to the casing on each side of said piston, a rotary and longitudinal reciprocatory valve stem, a valve on said stem controlling the passageway through one of said conduits, ratchet mechanism for operating said valve including a pair of collars on said stem, one of said collars being fixed to said stem and the other collar being loose thereon, cooperating ratchet faces on said collars, means for operating said ratchet mechanism, a cam on the fixed collar and means for engaging said cam to alternately open and close the valve as the collar and valve stem are rotated.

8. In a vehicle signal, a motor comprising a piston casing and piston, an oscillatory shaft to which said piston is fixed, a signal arm fixed to said shaft, a conduit leading to the casing on each side of said piston, a valve stem, a valve on said stem controlling the passageway through one of said conduits; ratchet mechanism for operating said valve, including a pair of collars on said stem, one of said collars being fixed to said stem and the other collar being loose thereon, cooperating ratchet faces on said collars; a flexible pull member attached to said loose collar and adapted upon being pulled to impart a partial rotation to the loose collar and a spring normally holding the ratchet faces in engagement and for returning the loose collar to initial position when the pull member is released, substantially as described.

ALLEN EVERT HALL.